United States Patent [19]
Aralt

[11] Patent Number: 4,609,309
[45] Date of Patent: Sep. 2, 1986

[54] PROCESS AND APPARATUS FOR THE TRANSPORT OF POWDERED OR PARTICULATE MATERIAL

[75] Inventor: Per T. Aralt, Bergen, Norway

[73] Assignee: Bergen Patentkontor, Bergen, Norway

[21] Appl. No.: 619,599

[22] PCT Filed: Oct. 6, 1983

[86] PCT No.: PCT/NO83/00040
  § 371 Date: Jun. 11, 1984
  § 102(e) Date: Jun. 11, 1984

[87] PCT Pub. No.: WO84/01562
  PCT Pub. Date: Apr. 26, 1984

[30] Foreign Application Priority Data
  Oct. 11, 1982 [NO] Norway ............... 823392

[51] Int. Cl.[4] .................................. B65G 53/48
[52] U.S. Cl. .......................... 406/56; 406/115; 406/142; 198/518
[58] Field of Search ............ 406/56, 55, 54, 115, 406/152, 141, 153, 142, 143, 138, 118, 117; 198/518, 513; 414/139, 144

[56] References Cited

U.S. PATENT DOCUMENTS

| | | | |
|---|---|---|---|
| 1,192,386 | 7/1916 | Cavacristi | 406/54 |
| 1,193,016 | 8/1916 | Heyl | 406/54 X |
| 1,193,057 | 8/1916 | Quigley | 406/54 |
| 2,602,707 | 7/1952 | Garoutte | 406/138 |
| 3,179,378 | 4/1965 | Zenz et al. | 406/142 |
| 3,964,793 | 6/1976 | Volpeliere | 406/142 X |
| 4,467,910 | 8/1984 | Siwersson et al. | 198/518 |

FOREIGN PATENT DOCUMENTS

| | | | |
|---|---|---|---|
| 76225 | 5/1959 | Canada | 406/143 |
| 960991 | 1/1975 | Canada | 406/152 |
| 2058700 | 4/1981 | United Kingdom | 406/143 |
| 749766 | 7/1980 | U.S.S.R. | 406/142 |

Primary Examiner—Jeffrey V. Nase
Assistant Examiner—L. E. Williams
Attorney, Agent, or Firm—Kenyon & Kenyon

[57] ABSTRACT

A process for the transport of powdered or particulate material from a container, such as a tank of a ship, via its upper opening to a separately disposed delivery location. The transport occurs with a transport apparatus which is provided with a feed head (31) for the detachment and feeding of material to the transport apparatus at its material intake end. The feed head pushes the material laterally inwards into the lower end of an upwardly directed transport pipe (30) just above an upwardly directd air current for fluidizing of the material gradually as it is pushed into the transport pipe and for transport of the material in the height direction through the transport pipe in a fluidized condition. The feed head is preferably provided with two diameterially opposite material feed openings for pushing the material from opposite directions towards the central axis of the transport pipe.

5 Claims, 2 Drawing Figures

PROCESS AND APPARATUS FOR THE TRANSPORT OF POWDERED OR PARTICULATE MATERIAL

The present invention relates to a process for the transport of powdered or particulate material from a container, such as a tank of a ship, via an upper opening to a separately disposed delivery location with a transport apparatus which is equipped with a feed head for detachment and feeding of the material to the transport apparatus at a material intake end.

As transport medium of interest can be mentioned powders based on lime, fly ash, flour, gypsum, hydrate of lime, potato flour, coal dust, magnesite concentrate, sodium sulphate, phosphate, PVC powder, soap powder, soda, alumina, cement, and the like.

It is known, for example in connection with the unloading of a tank of a ship, to utilise transport apparatus in the form of a transport pipe with an internal transport screw. By employing a closed transport pipe, problems are avoided with dust depositing of the surroundings, something which otherwise could create distinct environmental problems at the same time as the occurrance of a large wastage of transport material. Several of the afore-mentioned transport materials can in addition create large friction problems, so that a large consumption of power is required in order to lift the transport material upwards from and outwards from the container or the tank. The wear on bearings can be especially large, so that large maintenance expenses are required. However, a large proportion of the need for power consists in overcoming the friction between transport pipe (riser pipe) and transport material and between transport screw and transport material respectively. In addition to the weight loading of the material against the transport screw itself a significant laterally directed force occurs from the transport material towards the transport pipe and towards the transport screw and hence friction.

With the present invention the objective is to reduce the need for power to a significant degree by transporing the material in a fluidised state through a transport pipe more or less vertically upwards by means of an air current. The lifting force for such an air current is the same as in the known solution having a transport screw with an air current but according to the invention the forces of friction are reduced to a minimum.

The process according to the invention is characterised in that the feed means pushes the material laterally inwards into the lower end of an upwardly directed transport pipe just above an upwardly directed air current for fluidising the material gradually as it is pushed into the transport pipe and for transporing the material in the height direction through the transport pipe in a fluidised condition.

By pushing the material from the feed head in a relatively uniform current laterally inwards into the transport pipe an immediate fluidising of the transport material can be obtained by means of the air current from below and directed upwardly as the transport material is gradually discharged inwardly into the transport pipe and the air current can be employed simultaneously to transport (lift) the fluidised material upwardly through the transport pipe.

It is preferred according to the invention that the material at the upper end of the upwardly directed transport pipe is delivered to a further transport pipe or transport conduit extending obliquely downwards which in a manner known per se allows the material to flow in a fluidised condition in the longitudinal direction of the transport pipe.

By emptying the transport material in a fluidised state at the upper end of the transport pipe and delivering the transport material in a fluidised state into a further pipe-shaped transport means extending obliquely downwards, minimal power supply is required in order to transport the transport material further as a "running" medium downwardly through the transport pipe.

An apparatus for carrying out the process according to the invention is characterised in that the lower end of an upwardly directed transport pipe, just above a fluidising cloth having a connected lower supply of compressed air is provided with at least one material supply opening directed laterally inwards and preferably having two diametrically opposite material supply openings.

The material supply opening can if necessary extend over the whole periphery of the transport pipe, but it is preferred that there are employed two separate supply openings disposed to face each diametrically, so that one can get the material pushed in a direction-set manner inwardly towards the centre of the transport pipe in order thereby to get the transport material guided in a controlled manner inwardly towards the upwardly directed air current.

A further advantage arises with the further transport of the material in a fluidised condition. In this connection the apparatus is characterised in that the upper end of the transport pipe abuts in a right or acute angle with an upper end of a subsequent transport pipe extending obliquely downwards which in a manner known per se is provided with a longitudinal partition wall-forming fluidising cloth which divides the transport means into a lower section for the supply of fluidising compressed air and an upper section for the transport of fluidised material.

Further features of the invention will be evident from the following description having regard to the accompanying drawings, in which.

Figure 1:
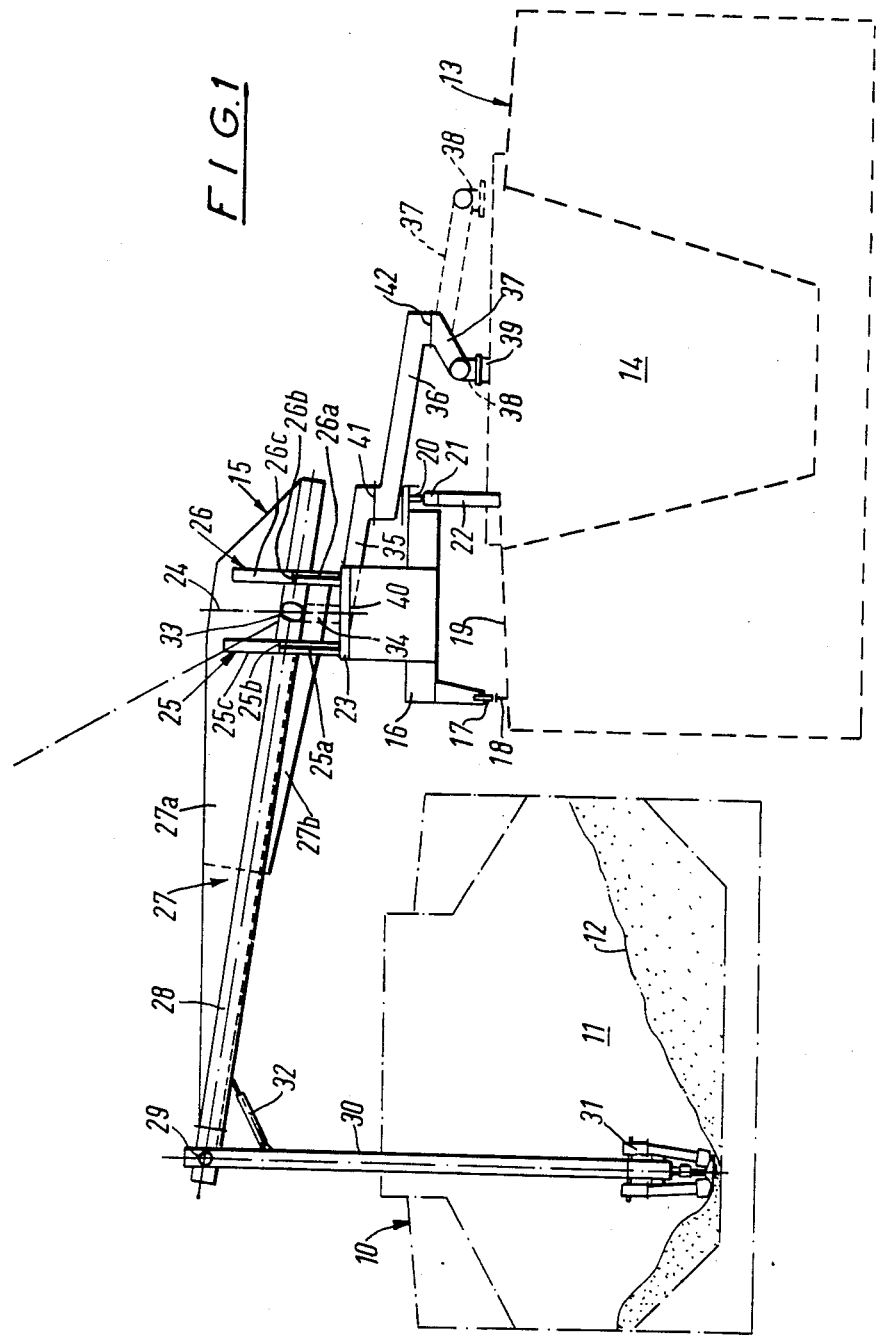
FIG. 1 shows a schematic elevation of the transport apparatus according to the invention used in connection with the transfer of powdered cargo from one ship to another.

In FIG. 1 there is shown a first ship 10 having a cargo tank or a hold 11 with powdered cargo which constitutes transport material 12 and which is to be transferred to the hold 14 of a second ship 13, by means of the transport apparatus 15 according to the invention.

The transport apparatus 15 is provided in the illustrated embodiment with a porch or carriage 16 with a first set of wheels 17 which roll on a rail guide 18 on deck 19 of the ship 13 and another set of wheels 20 which roll on a rail guide 21 on the cargo coaming 22 of the ship 13, so that the transport apparatus can be moved from hold to hold on the ship 13 and forwards and backwards along each hold as required.

The carriage 16 is equipped with a rotary tower comprising a support plate 23 which is rotatably mounted on the carriage about a vertical axis 24. The rotary tower can be be turned through 360°. On the support plate there are fastened a front set of two support means 25 and a rear set of two support means 26, where each set has its respective support means on each respective side of a support arm 27. Each support means consists of a piston rod 25a (26a) with associated piston 25b (26b) and a pressure medium cylinder 25c (26c). The piston rod is fastned to the support plate 23 while the cylinder is fastened by separate pivotable mounting to the support arm 27. The support means are fastened at a certain distance from each other so that by respective lifting and lowering of the cylinders on the piston rods of the different support means 25 and 26 the support arm 27 can be tilted in various ways by swinging about the longitudinal axis of the support arm 27 and by swinging about a crossing axis at right angles to the plane of the drawing. The support arm 27 can be raised an angle of about 15° and lowered an angle of about 60°.

The support 27 includes a transport pipe 28 which is longitudinally reinforced by means of vertically disposed upper and lower bracing plates 27a and 27b.

The transport pipe 28 enters into a transport conduit from the discharge location to the delivery location. At the forward, upper end of the transport pipe 28 there is pivotably mounted about a horizontal axis via a link connection 29 a transport pipe 30 which constitutes a riser pipe of the transport conduit. The transport pipe 30 is provided below with a feed head 31. The weight of the transport pipe 30, the feed head 31 and the transport material received in these is supported by the transport pipe 28. By means of a pressure medium cylinder 32 which is linkably connected to upper ends of the transport pipes 28 and 30, the transport pipe 30 with feed head 31 can be swung about the horizontal axis of the link connection 29.

At the rear lower end of the transport pipe 28 there is pivotably mounted about a horizontal axis via a link connection 33 a transport pipe 34 in the form of a down pipe. The pipe 34 can be mounted for telescopic axial displacement in and mounted for rotation about the vertical axis 24 in a linked transport conduit 35, 36, 37, 38 which leads to a delivery location 39 at the top of the hold 14 in the ship 13. The pipe sections of the transport conduit 35–38 are pivotably mounted relative to each other about vertical axes in link connections 40–42, in a manner known per se, so that the carriage 16 can be allowed movement along the rail guides 18 and 21 relative to the fixed delivery location 39.

Figure 2:
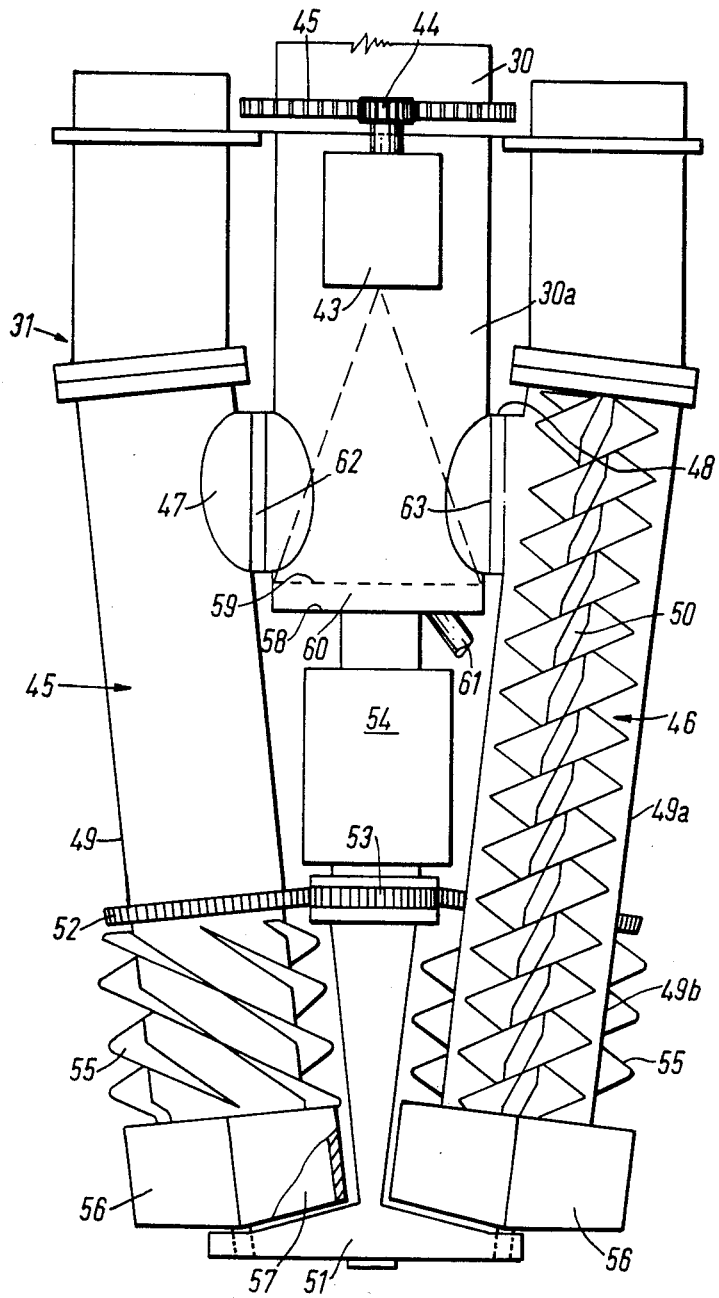
FIG. 2 shows a detail in the feed head of the apparatus and the transfer to the transport pipe of the apparatus.

In FIG. 2 there is shown in detail the lower portion of the transport pipe 30 and the associated feed head 31.

The transport pipe 30 has a lower pipe section 30a which is in rigid connection with the feed head 31 and the pipe 30 and the pipe section 30a are rotatably connected to each other about a vertical axis via abutting flanges with an associated (not shown) weight-transferring swivel bearing. By means of an electromotor 43 secured to the pipe section 30a and a gear wheel 44 which engages a gear rim 45 on the lower flange of the pipe 30 the pipe section 30a (and the feed head 31) can be rotated relative to the pipe 30.

The pipe section 30a supports two feed arrangements 45, 46 extending in parallel, one on each side of the pipe section via laterally directed pipe unions 47, 48. Each feed arrangement consists of a guide pipe 49 with associated internal lifting screw 50. The guide pipe consists of two sections 49a and 49b, of which the upper section 49a is rigidly connected to the pipe section 30a, while the upper end of the lower section 49b is rotatably mounted on the section 49a. The lower end of the section 49b is rotatably mounted in a base member 51 which is rigidly connected to the lower end of the pipe section 30a. The section 49b is provided in the upper part with a gear rim 52 which is driven via a gear wheel 53 from a drive motor 54. The section 49b is adapted to be driven in opposite rotary directions by the lifting screw 50. On the outside of the section 49b there are arranged external screw elements 55 with pitches corresponding to the lifting screw, but which are adapted to push the material in a downward direction while the lifting screw 50 pushes the material in an upward direction. At the lower end of the section 49b there is arranged a set of feed shovels 56 with intermediate introduction passages 57 to the lower end of the guide pipe 49.

A horizontally extending cloth 59 extends within the pipe section 30a just above the bottom 58 and defines an intermediate chamber 60 with the bottom 58. Compressed air is feed into the intermediate chamber 60 via a compressed air pipe 61. In addition, each of the pipe unions 47, 48 forms a feed supply opening 62, 63, respectively just above the cloth with each opening 62, 63 directed laterally inwards.

The material 12 which is detached from the supply at the bottom of the hold 11 of the ship 10 by means of the screw elements 55 and the feed shovels 56 on the feed arrangements 45, 46 and which is lifted upwards in the feed arrangements by means of the internal lifting screws 50 in a relatively tightly packed together condition, is pushed via the pipe unions 47, 48 laterally inwards into the pipe section 30a just above the cloth 59 and is discharged into an air current from the chamber 60, so that the material is immediately fluidised and with compressed air lifted upwards through the transport pipe 30. The feed arrangements 45, 46 which lift the material upwards towards the pipe unions 62, 63 in a tightly packed together condition prevent the compressed air being forced outwards unintentionally via the feed arrangements 45, 56. By adapting the amount of compressed air and the pressure of the flow of compressed air according to the speed of feeding of the feed arrangements there can be obtained an effective fluidising of the material by partly pushing the material outwards over the fluidising cloth and partly drawing the material outwards in the flow of compressed air through the fluidising cloth. It is found particularly favourable to convey the material to the space above the fluidising cloth via two diametrically opposite openings, so that the streams of material from the pipe unions 47, 48 are pushed towards each other in a direction inwardly towards the centre of the pipe section 30a.

At the upper end of the pipe 30 the transport material 12 is discharged via the link connection 29 into the upper end of the pipe 29 in a fluidised condition, that is to say the material is blown or caused to run in an angled direction inwardly into the pipe 28.

In a preferred embodiment the material 12 is transported in a fluidised condition from the pipe 30 further through the pipe 28 and the pipe conduit 35,38. In this connection pipes are used in the form of fluidising chutes which are divided in a known manner into an upper transport portion and a lower compressed air portion with an intermediate fluidising cloth as a partition wall. There is employed a separate feed for each individual pipe. In the fluidising chutes there is required only compressed air which is sufficient to ensure the maintenance of the transport material in a fluidised condition, the compressed air from the pipe 30 being discharged out through the pipe conduit 35–38 together with the fluidised transport material. In the fluidising chutes the transport material will be moved substantially to correspond to a "running" current of fluids.

In practice there can be employed various types of feed head together with the fluidising pipe 30 and there can be employed various types of transport means in the further transportation of the material through the pipe conduits 28 and 35–38, but the illustrated feed head and the illustrated fludising chutes are preferred with respect to a favourable combination with the fluidising of the material in the pipe 30.

We claim:

1. A transport apparatus for transporting particulate material comprising
    a transport pipe having an upwardly directed lower end and at least one laterally disposed feed opening in said lower end;
    a feed arrangement for pushing particulate material laterally through said feed opening of said pipe, said feed arrangement including an internal lifting screw for lifting the material in tightly packed manner to said feed opening, an external screw element concentric to said lifting screw and a feed shovel below and between said screw element and said lifting screw to convey material from said screw element to said lifting screw; and
    a compressed air pipe connected to said transport pipe below said feeding opening for directing an air current upwardly through said transport pipe to fluidize and lift particulate material fed into said transport pipe through said feed opening.

2. A transport apparatus as set forth in claim 1 wherein said transport pipe has a pair of diametrically disposed feed openings and a pair of said feed arrangements for pushing particulate material through each feed opening.

3. A transport apparatus as set forth in claim 1 which further comprises a second transport pipe extending obliquely downward from an upper end of the first transport pipe to convey a fluidized flow of the particulate material from said first transport pipe.

4. A transport apparatus as set forth in claim 3 wherein said second transport pipe is a fluidizing chute including a longitudinal partition wall between an upper transport portion and a lower compressed air portion.

5. A transport apparatus for transporting particulate material comprising
    a transport pipe having an upwardly directed lower end and at least one laterally disposed feed opening in said lower end for feeding of particulate material into said pipe;
    a feed arrangement for delivering particulate material to said feed opening of said transport pipe, said feed arrangement including an internal lifting screw for lifting the the material in a tightly packed manner to said feed opening, an external screw element concentric to said lifting screw and a feed shovel below and between said screw element and said lifting screw to convey material from said screw element to said lifting screw;
    a horizontally disposed cloth in said pipe below said feed opening; and
    a compressed air pipe connected to said transport pipe below said cloth for directing an air current upwardly through said cloth and said transport pipe to fluidize and lift particulate material fed into said transport pipe through said feed opening.

* * * * *

UNITED STATES PATENT AND TRADEMARK OFFICE
CERTIFICATE OF CORRECTION

PATENT NO. : 4,609,309

DATED : September 2, 1986

INVENTOR(S) : Per T. Aralt

It is certified that error appears in the above-identified patent and that said Letters Patent is hereby corrected as shown below:

Title Page, change the Assignee from "Bergen Patentkontor, Bergen" to --Kristian Gerhard Jebsen Skipsrederi A/S, Bergen-Solheimskviken--

Abstract, line 10 "directd" should be - directed-

Abstract, line 14 "diameterially" should be -diametrically-

Column 1, line 22 "of" should be -on-

Column 3, line 5 "fastned" should be -fastened-

Column 4, line 17 "feed" should be -fed-

Signed and Sealed this

Twenty-eighth Day of April, 1987

Attest:

DONALD J. QUIGG

Attesting Officer

Commissioner of Patents and Trademarks